United States Patent [19]  [11] Patent Number: 4,984,424
Shekleton  [45] Date of Patent: Jan. 15, 1991

[54] FUEL INJECTION SYSTEM FOR A TURBINE ENGINE

[75] Inventor: Jack R. Shekleton, San Diego, Calif.

[73] Assignee: Sundstrand Corporation, Rockford, Ill.

[21] Appl. No.: 272,407

[22] Filed: Nov. 17, 1988

Related U.S. Application Data

[63] Continuation-in-part of Ser. No. 156,219, Feb. 16, 1988.

[51] Int. Cl.⁵ .............................................. F23R 3/28
[52] U.S. Cl. .................................. 60/39.94; 60/39.141; 60/734
[58] Field of Search ................ 60/741, 39.141, 39.94, 60/39.06, 39.142, 734, 746; 137/239, 870, 876

[56] References Cited

U.S. PATENT DOCUMENTS

| | | |
|---|---|---|
| 2,580,365 | 12/1951 | Simmonds . |
| 2,610,466 | 9/1952 | Ballantyne et al. . |
| 2,619,162 | 11/1952 | Feilden ............................ 60/39.094 |
| 2,742,757 | 4/1956 | Jaquith . |
| 2,742,759 | 4/1956 | Flanigen et al. . |
| 2,846,845 | 8/1958 | Parker ............................. 60/39.094 |
| 2,881,827 | 4/1959 | Roche et al. .................... 60/39.094 |
| 2,938,338 | 5/1960 | Creswick et al. . |
| 2,963,082 | 12/1960 | Binford et al. ................... 60/39.141 |
| 3,103,229 | 9/1963 | Smith . |
| 3,367,107 | 2/1968 | Richardson et al. . |
| 3,611,717 | 10/1971 | Tissier . |
| 4,038,817 | 8/1977 | Snow et al. ........................... 137/870 |
| 4,169,491 | 10/1979 | Bajka .................................... 137/876 |
| 4,280,323 | 7/1981 | Jersey et al. . |
| 4,423,595 | 1/1984 | McLean ............................. 60/39.094 |
| 4,460,015 | 7/1984 | Burt et al. ........................... 137/870 |
| 4,464,895 | 8/1984 | Morrison et al. . |
| 4,491,272 | 1/1985 | Bradley et al. . |

Primary Examiner—Donald E. Stout
Assistant Examiner—Timothy S. Thorpe
Attorney, Agent, or Firm—Wood, Phillips, Mason, Recktenwald & VanSanten

[57] ABSTRACT

The components of a fuel injection system for a turbine engine 10 and provided with a purging system are reduced by utilizing a construction including a main control valve 24, at least one start fuel line 46 connected to a start injector 50, a plurality of main fuel lines 51 connected to respective main injectors 52 and a two-way valve 44 connected to the main fuel lines. The system includes a purge fuel line 54 and a three-way valve 28 connected to allow the flow of fuel to the start fuel line 46 and to the two-way valve 44 or for connecting the start fuel line 46 and the valve 44 to the purge line 34.

8 Claims, 2 Drawing Sheets

FUEL INJECTION SYSTEM FOR A TURBINE ENGINE

CROSS REFERENCE

This application is a continuation-in-part of commonly owned application Ser. No. 156,219 filed Feb. 16, 1988, entitled, "Fuel Purging System for a Turbine Engine" and naming Jack R. Shekleton and Roy K. Johanson as joint inventors of the subject matter thereof, the details of which are herein incorporated by reference.

FIELD OF THE INVENTION

This invention relates to turbine engines, and more particularly, to a fuel injection system for a turbine engine and to a purging system for the fuel injection system.

BACKGROUND OF THE INVENTION

Turbine engines include one or more combustors, each provided with one or more main fuel injectors for injecting fuel during normal operation of the engine and often, particularly in small engines, one or more start injectors which inject fuel while the engine is being started. These injectors include nozzles or outlets that are disposed within the combustion space of the combustor and which may include very small orifices in order to obtain a desired atomization of fuel upon injection.

Inasmuch as the orifices or outlets are within the combustor, they are exposed to substantial heat. During normal operation, this does not present a problem because the flow of fuel to the injector provides a cooling action and the propagation of combustion along with the flow of oxidant will prevent undesirable overheating of the injectors.

When operation of the turbine is terminated, fuel no longer flows through the fuel injector to cool the same. Similarly, oxidant is no longer passed into the combustor and the cooling action of the oxidant is no longer available. Consequently, residual heat in the combustor ar of the engine will cause elevation of the temperature of the fuel injectors. In terms of the material of which the injectors are formed, this raising in temperature upon cessation of operation of the turbine does not present a problem. However, the presence of residual fuel in the injector at such time will frequently cause a so-called coking problem. Being carbonaceous in nature, such fuel, upon being heated, will begin to undergo a destructive distillation reaction and a coke-like or and/or tarry residue will remain. This residue will clog the injectors and result in improper operation on subsequent start-ups.

Consequently, the injection system of turbine engines has been purged of fuels following shut-down to prevent coking from occurring and thus prevent clogging. In some cases, the purged fuel is dumped overboard. See for example, U.S. Pat. Nos. 2,846,845 and 3,426,527. In other cases, the fuel being purged is collected in a tank or the like. See U.S. Pat. Nos. 3,841,089 and 3,901,025.

While both approaches serve the purpose, the former is undesirable in that it requires a certain amount of plumbing to convey the fuel to be purged to an overboard point of discharge. The latter is even more undesirable because it will require some sort of a purge bottle which may be bulky and of substantial weight, and involves added complexities of valves, relief valves, check valves, etc., factors that are particularly disadvantageous in aircraft turbine installations.

In order to overcome these and other problems, there is disclosed, in the previously identified patent application of Shekleton et al, an improved fuel injection system including provision for purging of the same. This system works well for its intended purpose; and the present invention is directed to improving upon it, primarily in terms of simplifying system components and/or reducing the number of system components so as to minimize the cost of taking advantage of the efficiency accompanying use of that system.

SUMMARY OF THE INVENTION

The principal object of the invention is to provide a new and improved fuel injection system for a turbine engine of the type having a combustor with at least one start injector and a plurality of main injectors.

According to one aspect of the invention, the system comprises a main control valve, at least one start fuel line adapted to be connected to a start injector and a plurality of main fuel lines adapted to be connected to respective main fuel injectors. A first valve is connected to the main fuel lines and is openable to allow fuel to flow therethrough. The system also includes a purge fuel line and valve means are disposed between and connected to the main control valve and the first valve and connected to the start fuel lines and to the first valve for (a) allowing the flow of fuel to the start fuel line and the first valve, and (b) connecting the start fuel line and the first valve to the purge line.

As a consequence of this construction, the main control valve may be modulated to regulate fuel flow to all the injectors.

In a highly preferred embodiment, there is but a single main control valve so as to eliminate any need for a main control valve for the start injector systems.

A preferred embodiment of the invention contemplates that such a system be in combination with at least one start injector and a plurality of main injectors. One of the main injectors and the start injector are located in a single injector barrel so as to eliminate any need for two separate injector structures.

The invention contemplates that when a single injector barrel is utilized, it include a start fuel orifice and a main fuel orifice The two orifices are configured to allow a combined mass flow rate of fuel substantially equal to the mass flow rate of fuel through another one of the main injectors for substantially identical fuel pressures.

In a highly preferred embodiment, the first valve is a two-way valve and the valve means constitute a single three-way valve.

According to another facet of the invention, there is at least one start fuel injector and a plurality of main injectors as before. The start fuel injector and one of the main injectors are combined in a single injector head having a start fuel orifice and a main fuel orifice with the orifices being sized to produce, under similar fuel pressures, substantially the same mass flow rate of fuel as any other one of the main fuel injectors. A purge fuel line is included and a valve means is utilized that is operable to (a) allow fuel flow to the start fuel orifice only, (b) allow fuel flow to both the start and the main fuel orifices and to the other main fuel injectors, and (c)

halt fuel flow to any of the injectors while connecting the injectors to the purge line.

Other objects and advantages will become apparent from the following specification taken in connection with the accompanying drawings.

DESCRIPTION OF THE PREFERRED EMBODIMENT

Figure 1:
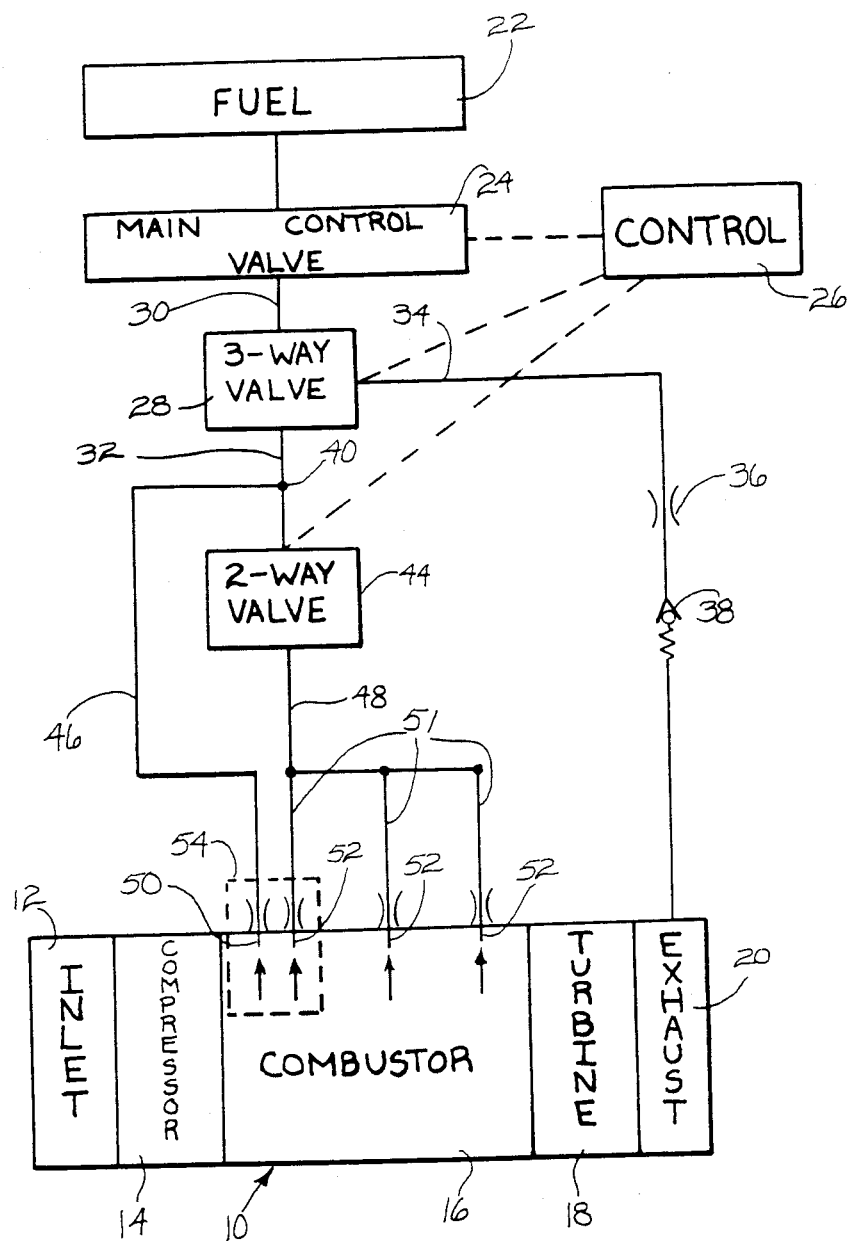
FIG. 1 is a schematic of a fuel injection system made according to the invention.

An exemplary embodiment of a fuel injection system made according to the invention is illustrated in the drawings and with reference to FIG. 1 is illustrated somewhat schematically in connection with a turbine engine, generally designated 10. As is well known, the turbine engine will typically include an inlet 12 extending to a rotary compressor 14. The rotary compressor 14 provides compressed air to a combustor 16 in which fuel is burned. Gases of combustion and dilution air from the combustor are then fed to a turbine or turbine wheel 18 to drive the same. Gas exiting the turbine 18 then exhausts the machine through an exhaust section 20.

According to the invention, a source of fuel 22 is provided. Fuel from the source 22 may be directed to the engine 10 via a main control valve 24. The main control valve modulates fuel flow as a result of control signals directed to it by a controller 26 as is well known. In addition to controlling the flow of fuel to match power requirements, the control system 26 may also control fuel flow based on other parameters including, for example, altitude compensation and the like.

Fuel passing through the control valve 24 is then admitted to a conventional three-way valve 28. The threeway valve is operable to connect an inlet 30 from the main control valve to an outlet line 32 or connect the outlet line 32 to a purge line 34. The purge line extends through an orifice 36 to an optional check valve 38. The check valve 38 is oriented to allow flow through the purge line 34 toward the exhaust 20 where it may be discharged but prevent reverse flow. The check valve also serves to prevent a fuel back purge into the exhaust at low engine speed in the event of an aborted start, after main fuel ignition has occurred, which may result from a sensing of excessive temperatures, etc. In such a circumstance, it would be undesirable to purge into the exhaust at low speed since the purged fuel would likely ignite. Consequently, the check valve 38 is selected so as to have sufficient internal closing force such that it will not open at the low pressures associated with such low speeds but will open when the engine has accelerated to a sufficient speed that will permit purge to occur. That is to say, the check valve 38 is selected so that it will open after the pressure in the combustor 16 is considerably above exhaust pressure. In the case of such an aborted start, the fuel lines will drain into the combustor 16 and as the engine runs down, fuel will be atomized and swept through the engine and out the exhaust. The orifice 36 is optional and when employed, controls the purge rate to a desired degree.

As an alternative to the use of the check valve 38, a two-way valve may be utilized in the line 34 which may be sequenced to open only when purge is desired as, when engine speed is sufficiently high to allow proper purging to occur. If such a change is made, then, of course, the three-way valve 28 might be dispensed with in favor of a second two-way valve and placed in the line 30 upstream of the line 34, to have the capability of completely avoiding a purge at undesirable times.

The outlet 32 from the three-way valve 28 is connected to a junction 40. The junction 40 in turn is connected to the inlet 42 of a two-way valve 44 and to a start fuel line 46. The start fuel line in turn is connected to a start fuel injector 50 within the combustor 16.

The two-way valve 44 includes an outlet 48 which in turn is connected to a series of main fuel lines 51. Each of the fuel lines 51 is connected to a main fuel injector 52 located within the combustor 16.

As schematically illustrated in FIG. 1, one of the main fuel injectors 52 along with the start injector 50 are contained in a single structure 54. This structure is better illustrated in FIG. 2. In particular, the combustor 16 includes radially spaced walls, the outer one of which is illustrated at 56. Compressed air nozzles 58 (only one of which is shown) open into the interior of the combustor 16 generally tangentially of the same if the combustor 16 is an annular combustor, which need not always be the case. As is well known, exteriorly of the outer wall 56 of the combustor 16 is a compressed air plenum 60 in fluid communication with the compressor 14. As a consequence, high pressure air will be directed into the interior of the combustor 16 through the nozzle 58.

Figure 2:
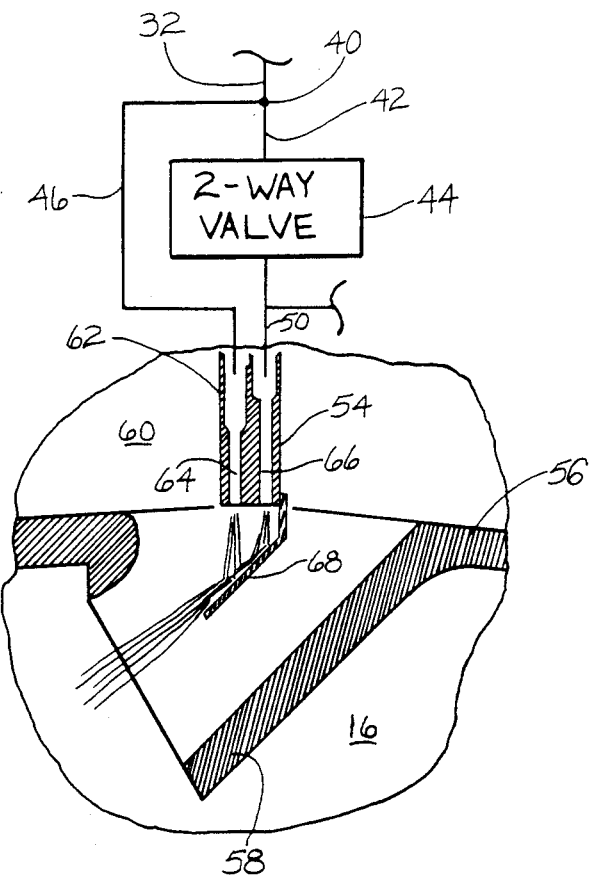
FIG. 2 is a somewhat schematic, sectional view of a combined start fuel and main fuel injector head.

The combined injector 54 is oriented as illustrated in FIG. 2. The same includes a single barrel 62 which terminates in two injection orifices 64 and 66. The injection orifice 64 is a start fuel injection orifice while the orifice 66 is a main fuel injection orifice. Both are directed at a plate 68 which is configured to provide impingement atomization of fuel exiting the orifices 64 and 66. As illustrated, the start fuel orifice 64 is connected to the start fuel line 46 while the main injection orifice 66 is connected to an appropriate one of the main fuel lines 51.

In a preferred embodiment of the invention, the orifices 64 and 66 are sized so that for a given fuel pressure, the mass flow rate of fuel through the two of them will be equal to the mass flow rate of fuel through each of the other main injectors 52. This provides for even distribution of fuel about the combustor to avoid the formation of hot spots. It is preferred that this relationship hold true over the various pressure levels that may be present in the system during its operation.

Operation is generally as follows When it is desired to start the turbine, the control 26 will exercise suitable control over the main control valve 24 and cause the three-way valve 28 to connect its inlet 30 to its outlet 32. This means that fuel will be delivered into the combustor 16 through the start injector 50 and more specifically, through the start fuel orifice 64. Control of the fuel flow will be exercised by the main control valve 24 at this time.

At an appropriate time during the starting sequence, the control 26 will operate the two-way valve 44. At this time, fuel will additionally be injected into the combustor 16 via the main fuel injectors 52 including the main fuel orifice 66. At this time, control of total fuel flow through both the start injector and through the main fuel injectors 52 will be exercised by the main control valve 24; and this will be true throughout normal operation of the system. In this regard, it is to be particularly noted that the start fuel injector 50 is operated continuously along with the main fuel injector 52 with which it is paired in the injector structure 54. This simplifies the system in that no separate means for connecting the start injector 50 to the purge line 34 independently of the main fuel injectors 52 is required.

Generally speaking on a conventional start as by an electric starter motor or the like, sequencing of the valve 44 to initiate operation of the main fuel injectors will occur after a suitable exhaust gas temperature sensor (not shown) has determined that the fuel injected by the start fuel injector 50 has been ignited. The object is, of course, to minimize the possibility of fuel entering from the main fuel injectors 52 not igniting. That is to say, if fuel from the start fuel injector 50 ignites, it is almost a total certainty that fuel subsequently injected through the main fuel injectors 52 will ignite.

Such a control will also shut down the engine if fuel from the start fuel injector 50 does not ignite after a fixed time as, for example, several seconds. In a fast start as, for example, under emergency conditions, there is no time for the system to wait for an exhaust gas temperature sensor to determine that there has been ignition of the start fuel stream. In such a case, the sequencing of the valves may be determined by engine speed.

When the system is to be shut down, to prevent residual heat from causing plugging of the injectors, the control 26 will cause the three-way valve to connect the junction 40 with the purge line 34 while maintaining the two-way valve 44 in an open condition. At this point in time, there will still be sufficient pressure within the combustor 16 that backflow through the lines 46 and 48 will occur and the fuel will ultimately be passed to the purge line 34 to be dumped into the exhaust 20. The use of the single combined injector 54 minimizes the number of separate injector structures that must be utilized in practicing the invention. It will also be appreciated that but a single main control valve 24 is utilized in controlling fuel flow to the combustor 16. This feature of the invention eliminates a separate and second main control valve customarily utilized to control fuel flow through the start injector 50. Thus the invention, when practiced in all of the facets heretofore described, eliminates one valve for controlling the purging of the start injector 50 and eliminates a control valve for controlling the flow of fuel to a start injector.

Finally, it should be kept in mind that while the invention has been described in the context of a system employing but a single start injector 50, the principals of the invention are applicable to systems including more than one start injector 50, as will be apparent to those skilled in the art.

I claim:

1. A fuel injection system for a turbine engine having a combustor with at least one start injector and a plurality of main injectors, said system comprising:
   a main control valve;
   at least one start fuel line adapted to be connected to a start injector;
   a plurality of main fuel lines adapted to be connected to respective main injectors;
   a first valve connected to said main fuel lines and openable to allow fuel to flow thereto;
   a purge fuel line; and
   valve means disposed between and connected to said main control valve and said first valve and connected to said start fuel line and said first valve for (a) allowing the flow of fuel to said start fuel line and said first valve and (b) connecting said start fuel line and said first valve to said purge line while halting flow to all of said main and start injectors.

2. The fuel injection system of claim 1 in combination with at least one start injector and a plurality of main injectors and wherein one of said main injectors and said start injector are located in a single injector barrel.

3. The fuel injection system of claim 2 wherein said single injector barrel includes a start fuel orifice means and a main fuel orifice means configured to allow a combined mass flow rate of fuel substantially equal to the mass flow rate of fuel through any other one of said main injectors for substantially identical fuel pressures.

4. The fuel injection system of claim 1 wherein said first valve is a two-way valve and said valve means constitutes a single three-way valve.

5. (Twice amended) A fuel injection system for a turbine engine having a combustor with at least one start injector and a plurality of main injectors, said system comprising:
   at least one start fuel injector;
   a plurality of main injectors;
   said start fuel injector and one of said main fuel injectors being combined in a single injector head having a start fuel orifice and a main fuel orifice, said orifices being sized to produce, under substantially identical fuel pressures, substantially the same mass flow rate of fuel as any other one of said main fuel injectors;
   a purge fuel line; and
   valve means operable to (a) allow fuel flow to said start fuel orifice only; (b) allow fuel flow to both said start and main fuel orifices and to said other main fuel injectors, and (c) halt fuel flow to all of said start and main injectors while connecting said start and main injectors to said purge line.

6. The fuel injection system of claim 5 wherein said valve means includes a three-way valve and a two-way valve.

7. The fuel injection system of claim 5 wherein said valves are serially connected with said two-way valve downstream of said three-way valve; and said start fuel orifice is in fluid communication with a point between said valves.

8. A fuel injection system for a turbine engine having a combustor with at least one start injector and a plurality of main injectors, said system comprising:
   a single main control valve;
   at least one start fuel injector;
   a plurality of main fuel injectors;
   at least one start fuel line connected to a said start fuel injector;
   a plurality of main fuel lines connected to respective main fuel injectors;
   said start fuel injector and one of said main fuel injectors being combined in a single injector head having a start fuel orifice and a main fuel orifice, said orifices being sized to produce, under substantially identical fuel pressures, substantially the same mass flow rate of fuel as any other one of said main fuel injectors;
   a two-way valve connected to said main fuel lines and openable to allow fuel to flow thereto for injection by said main fuel injector;
   a purge fuel line; and valve means disposed between and connected to said main control valve and said first valve and connected to said start fuel line and said first valve for (a) allowing the flow of fuel to said start fuel line for injection by said start fuel injector and to said first valve and (b) connecting said start fuel line and said first valve to said purge line;
   whereby said single main control valve may be modulated to regulate fuel flow to all said injectors.

* * * * *